US008005598B2

(12) United States Patent
Terashima et al.

(10) Patent No.: US 8,005,598 B2
(45) Date of Patent: Aug. 23, 2011

(54) CRANE AND CONTROLLER THEREOF

(75) Inventors: Kazuhiko Terashima, Toyohashi (JP); Makio Suzuki, Shinshiro (JP)

(73) Assignees: Sintokogio, Ltd., Aichin-Ken (JP), part interest; Kazuhiko Terashima, Aichi-Ken (JP), part interest ( * ) Notice: Subject to any disclaimer, the term of this patent is extended or adjusted under 35 U.S.C. 154(b) by 299 days.

(21) Appl. No.: 10/567,165

(22) PCT Filed: Aug. 5, 2004

(86) PCT No.: PCT/JP2004/011259

§ 371 (c)(1), (2), (4) Date: Jul. 17, 2008

(87) PCT Pub. No.: WO2005/012155

PCT Pub. Date: Feb. 10, 2005

(65) Prior Publication Data

US 2008/0275610 A1 Nov. 6, 2008

(30) Foreign Application Priority Data

Aug. 5, 2003 (JP) ................................ 2003-286366
Aug. 5, 2003 (JP) ................................ 2003-286367
Aug. 5, 2003 (JP) ................................ 2003-286369

(51) Int. Cl.
*B66C 13/06* (2006.01)
*G05B 13/04* (2006.01)

(52) U.S. Cl. ................ 701/50; 700/44; 700/45; 700/54; 700/55; 212/272; 212/273; 212/275

(58) Field of Classification Search .................. 212/272, 212/273, 274, 275; 700/44, 45, 54, 55; 701/50
See application file for complete search history.

(56) References Cited

U.S. PATENT DOCUMENTS 5,785,191 A * 7/1998 Feddema et al. .............. 212/275
(Continued)

FOREIGN PATENT DOCUMENTS

JP 1177982 7/1989
(Continued)

OTHER PUBLICATIONS

N. K. Bose, Digital Filters Theory and Applications. Malabar, Florida: Krieger Publishing Company, 1993.*

*Primary Examiner* — Thomas G Black
*Assistant Examiner* — Peter D Nolan
(74) *Attorney, Agent, or Firm* — Finnegan, Henderson, Farabow, Garrett & Dunner, L.L.P.

(57) ABSTRACT

A method and a system for controlling a crane drive unit so as to suppress sway of a load suspended by a rope of a crane, which sway occurs when the load has been transported from a first position to a second position, the control being made by operating a controller having a filter unit by using a feedforward control program. The method is to control the crane drive unit so that the load does not greatly sway when it is transported from the first position to the second position by removing a component near a resonance frequency by the filter unit from a transportation command for the load, in which command the maximum value among at least one of a transportation speed, transportation acceleration, and transportation jerk is limited, under the resonance frequency sequentially computed from a rope length that is a distance from the center of rotation of the sway of the rope to the center of gravity of the load and under parameters that relate to a control unit of the crane drive unit and that are previously calculated so as not to exceed the performance of the crane drive unit, and by inputting in the crane drive unit the transportation command, from which the component near the resonance frequency is removed.

3 Claims, 3 Drawing Sheets

U.S. PATENT DOCUMENTS

| | | | | |
|---|---|---|---|---|
| 5,908,122 | A | 6/1999 | Robinett et al. | |
| 6,102,221 | A * | 8/2000 | Habisohn | 212/270 |
| 6,442,439 | B1 * | 8/2002 | Robinett et al. | 700/55 |
| 6,496,765 | B1 | 12/2002 | Robinett et al. | |

FOREIGN PATENT DOCUMENTS

| | | |
|---|---|---|
| JP | 8253950 | 10/1996 |
| JP | 2000038286 | 2/2000 |
| WO | WO 02/070388 A1 | 9/2002 |

* cited by examiner

CRANE AND CONTROLLER THEREOF

TECHNICAL FIELD

This invention relates to controlling a crane, and in particular to controlling a crane drive unit so as to suppress the sway of a load carried by the crane so that it is at a minimum during and after the transportation of the load.

BACKGROUND ART

A crane is widely used to transport a load. An operator of a crane must be skilled in its operation to frequently and repeatedly turn the operation switch of the crane on and off so as to suppress the sway of the load during its transfer by the crane. Moreover, since the operator has to wait so as to perform the next step until the sway stops once it is generated, some problems in the safety aspect, such as a problem in that a load is being made unstable and so on, are occasionally caused. Therefore, suppressing the sway of the load of a crane is a great subject in the crane industry.

Therefore, various improvements have been developed for suppressing the sway of the load of a crane. For instance, JP A 2000-38286 discloses a sway-suppressing device for a rotary crane. The device includes: monitor means for imaging the position of a transported load; image processing means for processing the output on the image from the monitor means to compute information, including information on the distance of the load; angle detecting means for inputting the output of the image processing means to detect the angle of a crane boom; and crane driving means for controlling the operation of the crane boom according to the information on the distance from the image processing means and the information on the crane boom angle from the angle detecting means so that the transportation orbit of the load, which orbit is drawn by hoisting, drawing inward, and turning the crane boom, is made to form straight lines in the form of a polygon.

However, clearly from the teaching of JP, A, 2000-38286, the conventional improvement for the sway suppression requires the monitor means, the angle detecting means, etc., and the arrangement for them is complicated.

DISCLOSURE OF THE INVENTION

The present invention has been conceived in view of the problems discussed above. The purpose of the invention is to provide a crane system and its controller or control system that have a simple structure and that can suppress the sway of a load suspended from the crane rope without requiring a lot of skill, which sway is generated at the moment when the load is transported from a first position to a second position.

To the above end, the present invention inputs into a crane control unit a signal that is converted from a signal concerning the length of the rope of the crane by a feedforward control so as not to cause any sway of the load, so that the sway of the load generated at the moment when the load suspended from the rope of the crane is transported from a first position to a second position is suppressed.

In this invention, a crane control unit denotes a device for driving elements of a crane such as a boom, a girder, a trolley, and the like, i.e., for controlling the turning, hoisting, and running of those elements depending on the types of cranes.

In the first aspect of the present invention, a method is provided for controlling a crane drive unit so as to suppress the sway of a load suspended by a rope of a crane, which sway occurs when the load has been transported from a first position to a second position, the control being made by operating a controller having a filter unit by using a feedforward control program, the method comprising: removing a component near a resonance frequency by the filter unit from a transportation command for the load, in which command a maximum value among at least one of a transportation speed, transportation acceleration, and transportation jerk is limited, under resonance frequencies sequentially computed from a rope length that is a distance from the center of rotation of the sway of the rope to the center of gravity of the load, and under parameters that relate to a control unit of the crane drive unit and that are previously computed so as not to exceed a performance of the crane drive unit; and inputting the transportation command, from which the component near the resonance frequency is removed, into the crane drive unit, thereby controlling the crane drive unit so that the load does not greatly sway when the load is transported from the first position to the second position.

In the second aspect of the present invention, a system is provided for controlling a crane drive unit so as to suppress the sway of a load suspended by a rope of a crane, which sway occurs when the load has been transported from a first position to a second position, the control being made by operating a controller having a filter unit by using a feedforward control program, the system comprising: a rope length detection unit for detecting a rope length that is a distance from the center of rotation of the sway of the rope to the center of gravity of the load; a resonance frequency computing unit for computing a resonance frequency of the rope having said rope length; a transportation command transmitting unit for transmitting a transportation command for the load given by a transportation command applicator; a parameter computing unit for previously computing parameters for a control unit of the crane drive unit so that the parameters do not exceed a performance of the crane drive unit; a parameter storing unit for receiving and storing the parameters from the parameter computing unit; a maximum value limiting unit for limiting a maximum value among at least one of a transportation speed, transportation acceleration, and transportation jerk in the transportation command for the load from the transportation command transmitting unit under the parameters from the parameter storing unit; and a filter unit for receiving the resonance frequency from the resonance frequency calculating unit, the filter unit removing a component near the resonance frequency from the transportation command, in which the maximum value is limited by the maximum value limiting unit, under the parameters from the parameter storing unit, the filter unit inputting in the crane drive unit the transportation command, from which the component near the resonance frequency is removed.

In the third aspect of the present invention, a media is provided in which the feedforward program used in the first or second aspect is described.

The control system of the first and second aspects can be used for a crane that has a jib, such as a jib crane (a rotary crane), a tower crane, a truck crane, a wheel crane, a rough terrain crane, a crawler crane, and a derrick crane; and an overhead traveling crane, a bridge crane, or the like, which has a crane girder or, according to circumstances, a trolley (a truck).

In the present invention, the term "a filter" or a "filter unit" denotes a circuit or a circuit unit or portion that has a pair of I/O terminals wherein a transfer function between these terminals has a frequency characteristic.

Further, in the present invention the term "a feedforward control" or a "feedforward control method" denotes a controlling method wherein a target output value is obtained by previously adjusting a manipulated variable of a subject to be controlled. By this control method, a good control is performed when the I/O relations, the influence of turbulence, and so on, for the subject to be controlled, are clear.

Further, in the present invention the term “a jerk” is a gradient of an acceleration concerning time (the dimension for it is $L/T^3$, where L is the dimension in length, and T is the dimension in time).

By the way, by limiting the maximum value among at least one of a transportation speed, a transportation acceleration, and a transportation jerk in a transportation command for a load as in the present invention, it can be ensured that the command does not exceed the performance, especially the acceleration performance, of the crane drive unit.

Moreover, by filtering the transportation command for the load to remove the component of resonance frequency as in the present invention, the control performance of the control units of the crane drive unit can be prevented from greatly deteriorating even if an error is included in the detected rope length.

In the fourth aspect of the present invention, a crane is provided, the crane having a turning motor for turning the crane boom, a turning motor control unit for controlling a speed and a direction of rotation of the turning motor, a rolling-up motor for rolling a rope of the crane up and down, and a rolling-up motor control unit for controlling a speed and a direction of rotation of the rolling-up motor, and further comprising: a rope length detection unit for detecting a present length of a rope of the crane; and a controller electrically coupled to both the turning motor control unit and the rolling-up motor control unit, the controller outputting to the turning motor control unit a signal transformed from a signal of the rope length by a feedforward control so as to suppress the sway of a load suspended from the rope at a moment when the load has been transported from a first position to a second position.

The crane of the fourth aspect of the present invention may further include a boom-hoisting motor for hoisting the crane boom and a boom-hoisting motor control unit for controlling a speed and a direction of rotation of the boom-hoisting motor, wherein the boom-hoisting motor control unit is electrically coupled to the controller, and the controller further outputs into the boom-hoisting motor control unit the signal transformed from the signal of the rope length by the feedforward control so as to suppress the sway of the load suspended from the rope at the moment when the load has been transported from the first position to the second position. The controller can be attached to an existing crane.

In the fifth aspect of the present invention, a controller for a crane attachable to an existing crane is provided, the controller including a turning motor for turning the boom of the crane, a boom-hoisting motor for hoisting the boom, a turning motor control unit for controlling a speed and a direction of rotation of the turning motor, and a boom-hoisting motor control unit for controlling a speed and a direction of rotation of the boom-hoisting motor, wherein only a signal of a rope length of the crane is inputable to the controller, and wherein the controller outputs a signal transformed from the signal of the rope length by a feedforward control so as to suppress the sway of a load suspended from a rope of the crane at a moment when the load has been transported from a first position to a second position under the condition that there is no disturbance.

The crane of the fourth and fifth aspects of the present invention is a crane having a jib, such as a jib crane (a rotary crane), a tower crane, a truck crane, a wheel crane, a rough terrain crane, a crawler crane, a hammer-head crane, a derrick crane, or the like.

The other features and structures of the present invention will be clear from the embodiments described below in relation to the accompanying drawings.

BEST MODE FOR CARRYING OUT THE INVENTION

The embodiments of this invention are described below in detail on the basis of the accompanying drawings.

Figure 1:
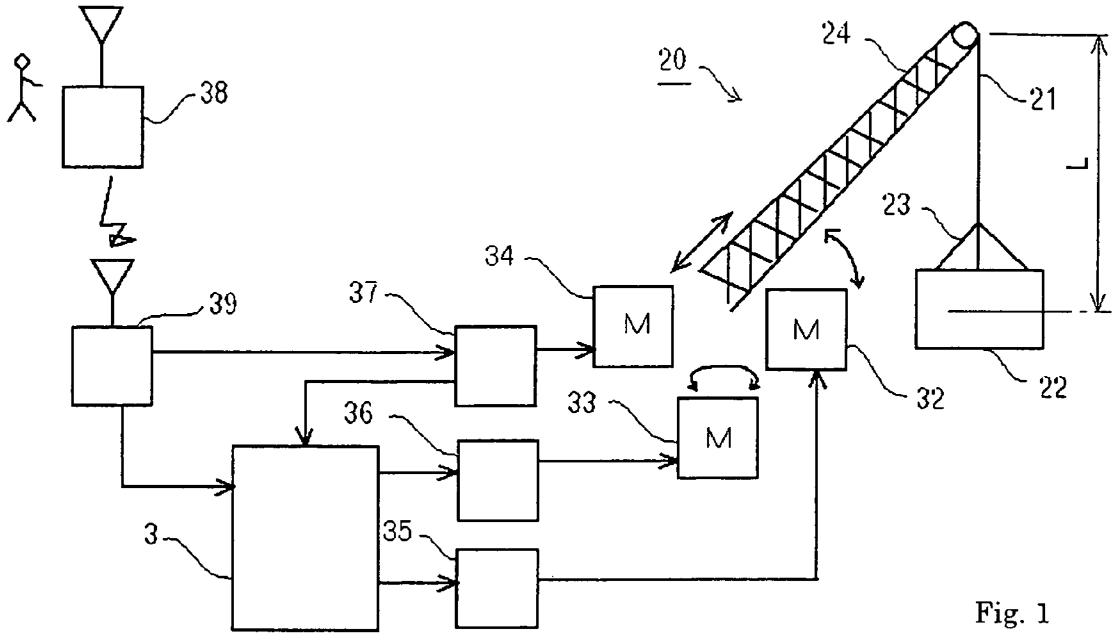
FIG. 1 is a schematic drawing showing an embodiment of the crane system of this invention.
Figure 2:
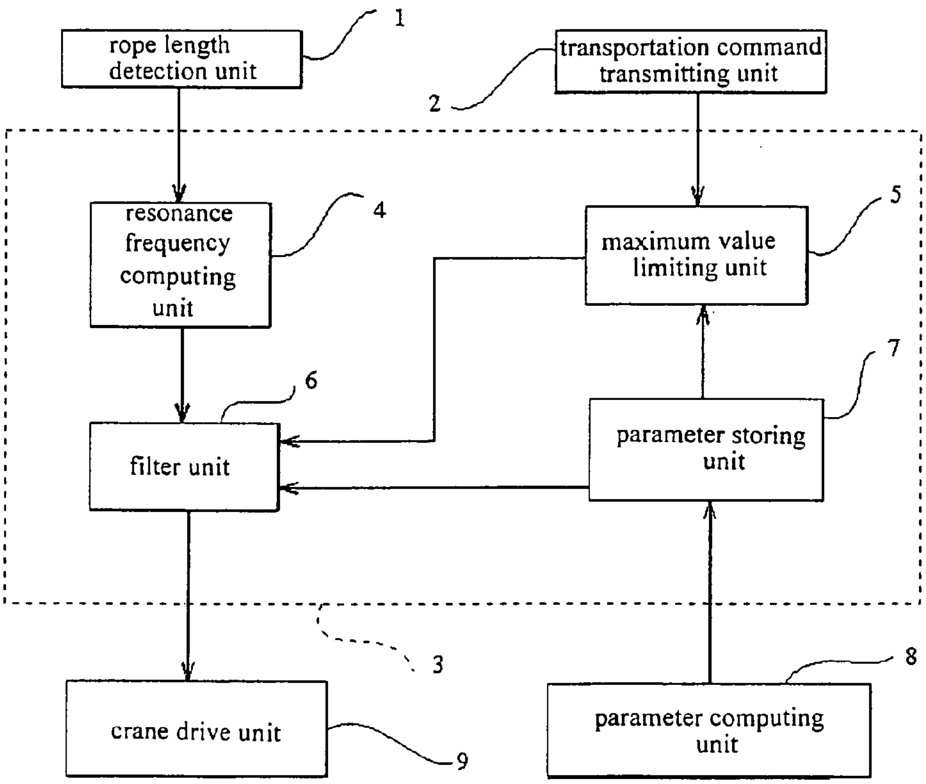
FIG. 2 is a block diagram showing the first embodiment of the controller for controlling the sway of a load of the crane shown in FIG. 1.

First, the first embodiment of a crane that executes this invention is explained on the basis of FIGS. 1 and 2.

FIG. 1 is a schematic diagram that shows one embodiment of the crane of this invention. FIG. 2 is a block diagram that shows a system for controlling a crane drive unit of the crane shown in FIG. 1.

In FIG. 1, a crane 20 has a rope 21 for suspending a load 22, a hoisting drum (not shown) for rolling the rope up and down, a boom 24, a boom-hoisting motor 32 for hoisting the boom, a turning motor 33 for turning the boom, and a rolling-up motor 34 for rotating the hoisting drum (not shown) to roll the rope 21 up or down. These motors may be electric or hydraulic.

Each of the boom-hoisting motor 32, the turning motor 33, and the rolling-up motor 34 is electrically coupled to its control unit. Specifically, the boom-hoisting motor 32 has a boom-hoisting motor control unit 35 that controls hoisting the boom 24 and its hoisting speed, while the turning motor 33 has a turning motor control unit 36 that controls the speed and the directions of the boom 24. The boom-hoisting motor control unit 35 and the turning motor control unit 36 are electrically coupled to a controller 3. The controller 3 may be a computer, and is connected to a rolling-up motor control unit 37 and a receiver 39.

The rope 21 may be connected to the load using a hoisting attachment or attachments 23 (for instance, a hook attached to the distal end of the rope 21 and/or other necessary slinging wires, turnbuckles, etc.). In this specification and claims, the term “a load” denotes an actual load to be transported and/or a hoisting attachment or attachments. Further, the length (L) of the rope denotes the distance from the center of rotation of the sway of the rope 21 at the distal end of the boom (for instance, in the rotary crane the center of rotation is called a “sheave”) to the center of gravity of the load, as shown in FIG. 1.

As shown in FIG. 2, the crane 20 also has a rope length detection unit 1 and a transportation command transmitting unit 2. In this embodiment, as shown in FIG. 2 a controller 3 includes a resonance frequency computing unit 4, a maximum value limiting unit 5, and a filter unit 6. The rope length detection unit 1, the controller 3, and a parameter computing unit 8 together compose a control system as a whole.

The rope length detection unit 1 is a means for measuring or detecting the distance from the center of rotation of the sway of the load suspended by the rope 21 to the center of gravity of the load, and can take any forms for its purpose to be accomplished. For instance, a well-known encoder, a laser range finder, or the like, may be used as the rope length detection unit.

A transportation command for the load is a command signal for transporting the load, generated by an operator of the crane by keeping depressed a button or buttons, or the like, for turning and/or hoisting the crane boom (or for running a girder and a trolley in the case of an overhead traveling crane or the like, which will be described below with reference to FIG. 6) or for operating the rolling-up motor.

Further, a transportation command denotes a command inputted as an input signal from a computer, which is separately arranged, if the load is to be transported to a fixed point.

For instance, in this embodiment the transportation command denotes a command for the load that is applied to the rolling-up motor control unit 37, the boom-hoisting motor control unit 35, and the turning motor control unit 36. The command varies depending on the type of cranes and depending on whether all the operations for the transportation by a crane are automatically carried out, or whether an operator carries out the operations.

In this embodiment, as shown in FIG. 1, the receiver 39 is connected with an operation box 38 via a cable or by wireless. The operation box 38 acts as a transportation command input unit (a transportation command applicator) for inputting a transportation command or commands for the load 22, under a prescribed condition on the transportation of the load 22, while the receiver 39 acts as a transportation command transmitting unit 2 for transmitting a transportation command or commands to the controller 3, as shown in FIG. 2. As referred to above, both the transportation command input unit and the transportation command transmitting unit may be computers.

As shown in FIG. 1, the controller 3 is electrically coupled to the control units 35, 36 of the motors 32, 33, which motors act as a crane drive unit 9 of the crane 20. As shown in FIG. 2, the controller 3 includes: a resonance frequency computing unit 4 for computing a resonance frequency of the rope 21 having a length L obtained by the rope length detecting unit 1; a parameter storing unit 7; a maximum value limiting unit 5 for limiting a maximum value among at least one of a transportation speed, transportation acceleration, and transportation jerk in the transportation command for the load from the transportation command transmitting unit 2 under the parameters in the parameter storing unit 7; and a filter unit 6 for removing a component near the resonance frequency that is a result of the computation by the resonance frequency computing unit 4 from the result of the maximum value limiting unit 5 and for inputting in the crane drive unit a transportation command from which the component near the resonance frequency is removed (namely, a filter unit 6 for computing a drive condition on the crane drive unit 9 so as to suppress the sway of the load 22 that will be generated at the moment when the load is transported from a first position to a second position and for inputting the condition into the crane drive unit).

The parameter computing unit 8 of the control system previously computes the parameters for the control units of the crane drive unit 9, the parameters not exceeding the performance of the crane drive unit 9, and the parameter storing unit 7 of the controller 3 stores the computed results of the parameter computing unit 8 and outputs the parameters for the control units 35, 36, and 37 of the crane drive unit 9 to the maximum value limiting unit 5 and filter unit 6.

There is a parameter used to limit the maximum value and a parameter used for the filter unit.

The operations interrelated with the units of the controllers 3 are executed by a feedforward control program. In this embodiment, the feedforward control program is stored in a medium, and the control system is adapted to use this medium.

A transporting operation of the load 22 is explained below, in which operation the load is lifted up by rotating the hoisting drum for a required time after being engaged with the lower end of the rope 21, as shown in FIG. 1, and is then transported from a first position to a second position. When the load 22 (a subject to be carried) is lifted up by rotating the hoisting drum for the required time, the rope length detection unit 1 detects the length of the rope and inputs the detected result on the length into the resonance frequency computing unit 4 of the controller 3. Then, the resonance frequency computing unit 4 computes a resonance frequency of the rope 21 of the length and inputs the computed result on the frequency in the filter unit 6.

On the other hand, a transportation command for the load 22 is input from the transportation command applicator 38 into the transportation command transmitting unit 2, which transmits the transportation command for the load 22 to the maximum value limiting unit 5. Then the maximum value limiting unit 5 reads the parameters for the control units 35, 36, 37 from the parameter storing unit 7, which parameters do not exceed the performance of the crane drive unit 9, and limits a maximum value among at least one of a transportation speed, a transportation acceleration, and a transportation jerk in the transportation command for the load. The maximum value limiting unit 5 then inputs the result on the limitation into the filter unit 6.

After that, the filter unit 6 acts to read the parameters of the control units 35, 36, 37, which do not exceed the performance of the crane drive unit 9, and under the resonance frequency sequentially computed from the rope length, acts to filter the transmission command, which is to be applied to the crane drive unit 9, and in which the maximum value among at least one of the transportation speed, transportation acceleration, and transportation jerk is limited, to remove a component near the resonance frequency. The filter unit 6 then inputs the transportation command, which is so filtered, into the crane drive unit 9. Accordingly, the crane drive unit 9 is controlled and operated so that the load 22 does not sway greatly at the moment when it is transported from the first position to the second position.

The computation by the filter unit 6 is carried out based on the following theory. Namely, the filter can be shown by expression (1) by assuming the time series data to be input into the filter unit 6 as x(t) and the time series data output from the filter unit 6 as y(t).

Expression (1)

$$y(t) = b_0(f)x(t) + b_1(f)x(t-1) + b_2(f)x(t-2) + \dots - a_1(f)y(t-1) - a_2(f)y(t-2) - \dots$$

$$y(t) = \sum_{j=0}^{m} b_j(f)x(t-j) - \sum_{i=1}^{n} a_i(f)y(t-i)$$

where $a_i(f)$ and $b_j(f)$ are parameters mediated by the resonance frequency f sequentially computed for the varying length of the rope 21.

The resonance frequency f of the rope length L is $$\sqrt{\frac{g}{L}},$$

where g denotes the acceleration of gravity. This resonance frequency f is computed by the resonance frequency computing unit 4.

Further, x(t−j) denotes time series data to be input before the control period starts, and Y(t−i) denotes time series data to be output before the control period starts.

Although the item numbers m and n may be arbitrarily determined according to the structure of the filter, they must be predetermined. For the primary low-pass filter, m=0 and n=1 must be predetermined, for the secondary low-pass filter, m=0 and n=2, and for the notch filter, m=2 and n=2. The predetermined item numbers m and n are input to the parameter storing unit 7 and the parameter computing unit 8.

Moreover, the parameters $a_i(f)$ and $b_j(f)$ should be computed beforehand by the parameter computing unit 8. They are determined by using the parameter computing unit 8 in a simulation in which a model expressing the characteristic of the crane is used, and by changing their values little by little.

The constraint conditions on that determination are one wherein the maximum speeds in the transportation command applied to the crane drive unit 9 do not exceed the maximum speed of the crane drive unit 9 (i.e., the speed of the motors 32, 33, and 34), one wherein each maximum value in the transportation command applied to the crane drive unit 9 does not exceed the limitation of the maximum value of the crane drive unit 9, and one wherein it satisfies the two foregoing conditions and makes the transportation time the shortest.

By the way, expression (1) is obtained by carrying out a Z-transformation to the transfer function of the filter shown below in expression (2).

$$F(S)=\frac{Y(S)}{X(S)}=\frac{b_0(f)S^0+b_1(f)S^1+b_2(f)S^2+\dots}{a_0(f)S^0+a_1(f)S^1+a_2(f)S^2+\dots}=\frac{\sum_{j=0}^{m} b_j(f)S^j}{\sum_{i=0}^{n} a_i(f)S^i} \quad \text{Exprression (2)}$$

where S is a Laplacian operator.

Figure 3:
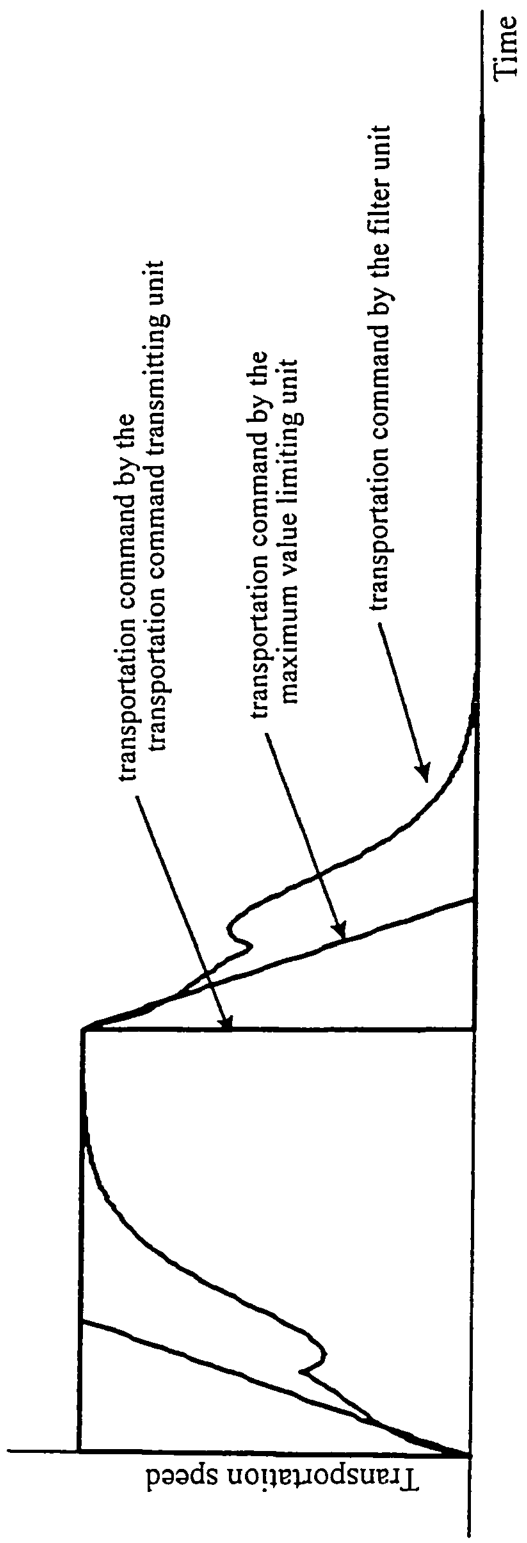
FIG. 3 is a diagrammatic chart (time in the abscissa, and a transportation speed in the ordinate) that compares the transportation speed of the load caused by the crane system of FIG. 1 with that caused in one case that does not use this invention.

Thus, the transportation command from the transportation command transmitting unit 2 changes as shown in FIG. 3. In FIG. 3, the straight lines, where the transportation speed is constant, show a transportation command by the transportation command transmitting unit; the trapezoidal straight lines show a transportation command when the limitation is made by the maximum value limiting unit; and a curve shows a transportation command when the filtering is carried out by the filter unit.

Figure 4:
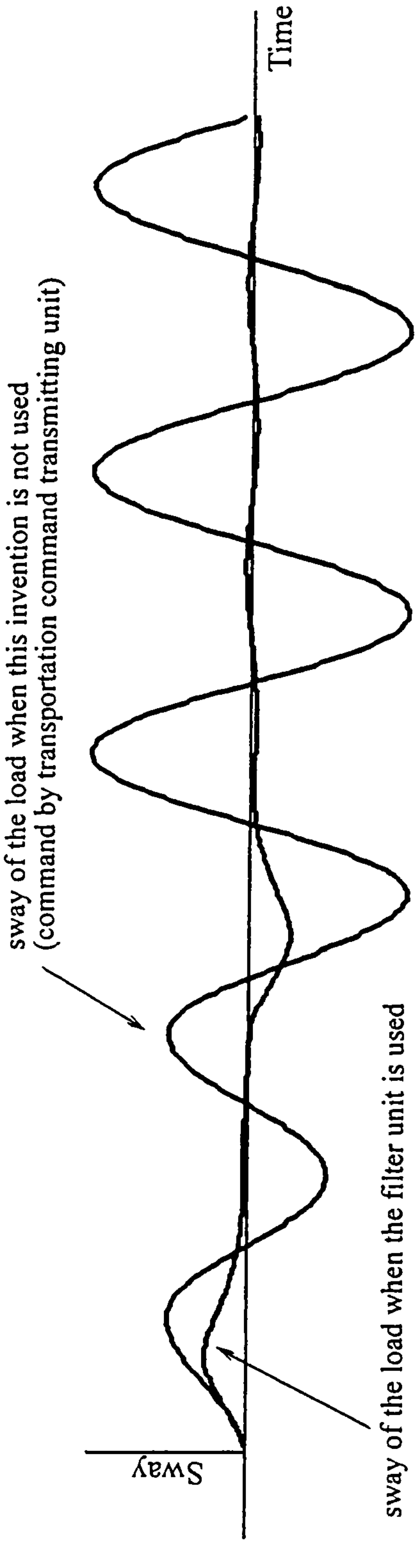
FIG. 4 is a diagrammatic chart (time in the abscissa, and the sway of the load in the ordinate) that compares the sway of the load caused by the crane system of FIG. 1 with that caused in one case that does not use this invention.

Under the parameters of the control units of the crane drive unit 9, which are previously computed so as not to exceed the performance of the crane drive unit 9, the filter unit 6 filters the transportation command in which the maximum value among at least one of the transportation speed, the transportation acceleration, and the transportation jerk is limited, to remove a component near the resonance frequency from the command and inputs the filter-processed command into the crane drive unit. Accordingly, the sway of the load 22 is suppressed as shown in FIG. 4.

Figure 5:
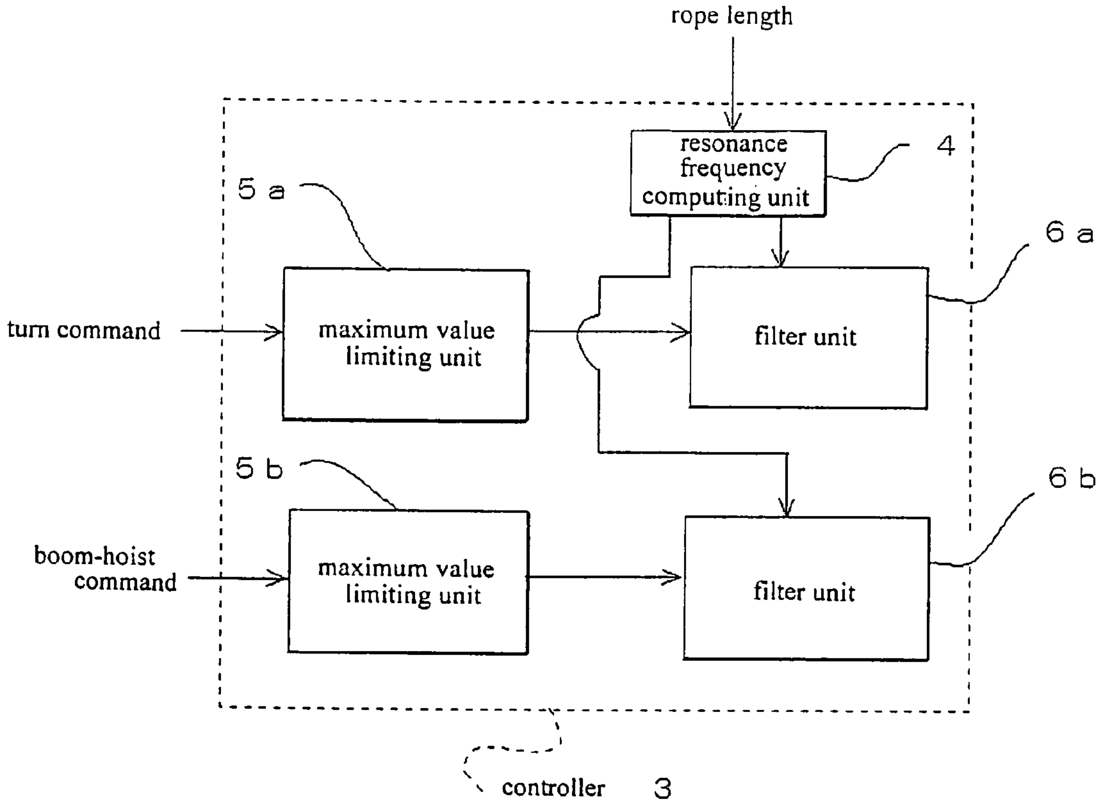
FIG. 5 is a block diagram showing the second embodiment of the controller for controlling the sway of the crane of FIG. 1.

In FIG. 5, another embodiment of the controller 3 of the crane system 20 of FIG. 1 is shown.

As in FIG. 5, a signal corresponding to a length L of the rope is supplied from the rope length detection unit 1 (FIG. 2) to the controller 3. The controller 3 outputs a signal that is converted by a feedforward control from just the signal for the rope length L so as not to cause any sway of the load when there is no turbulence, into the turning motor control unit 36 and the boom-hoisting motor control unit 35.

Further, the rolling-up motor control unit 37 now controls the direction and speed of rotation of the rolling-up motor 34. The rolling-up motor control unit 37 may be, for instance, an inverter that outputs the signal corresponding to the rope length into the controller 3.

The operation of the crane system is now described. The operator operates the crane via the operation box 38. In the crane system of this embodiment, the crane is driven so as to roll the rope up and to turn and hoist the crane boom.

Among the signals generated by the operator's operation of the operation box 38, the signal for rolling up the rope directly operates both the rolling-up motor control unit 37 and the rolling-up motor 34, via the receiver 39 (but not via the controller 3), thereby changing the rope length L.

On the other hand, the signals for turning and hoisting the crane boom, among the signals generated by the operator's operation of the operation box 38, are transmitted via the receiver 39, and also via the controller 3, where they are transformed by the feedforward control based on the rope length L to signals that do not cause any sway of the rope. The controller then sends the transformed signals to the turning motor control unit 36 and the boom-hoisting motor control unit 35, thereby controlling the direction (or directions) and speed (or speeds) of rotation of the turning motor 33 and the direction (or directions) and speed (or speeds) of rotation of the boom-hoisting motor.

Thus, just by adding to an existing crane the unit for detecting (or computing) the rope length and the additional controller, the sway of the load carried by the crane is reduced.

Though in this embodiment the directions and speeds of rotation of the turning motor 33 and the directions and the speeds of rotation of the boom-hoisting motor 32 are controlled, in the case of a crane that has no hoisting mechanism it is clear that only the signal for the rope length is transformed, and that just the turning of the motor 33 is controlled for the control of turns of the boom or the like. Though in this invention the crane provided with the boom-hoisting motor 32, the turning motor 33, and the rolling-up motor 34 is used, the boom-hoisting motor 32 may not be necessary.

Further, though in this invention the inverters are used for the turning motor control unit 36 and the boom-hoisting motor control unit 37, it is also possible to use a phased control of the speed (for instance, a two-stage control), without using the inverters, so as to make the system cheap.

From the beginning it is also possible to attach the controller 3 to a new crane, instead of attaching it to an existing crane.

Next, a controller 3, as in FIG. 5, used for the feedforward control of this invention, is described in detail. The controller 3 uses a computer that is operated by a program that applies a feedforward control method to the crane provided with the rolling-up motor control unit 37, which adjusts rolling the rope up and down. This controller 3 uses two input signals; one is the output signal inputted from the transportation command inputting and transmitting unit, which inputs and outputs (transmits) a transportation command for the load 22, and the other is the output result inputted from the rope length detection unit. The transportation commands for the load 22 are a rolling-up command, a turn command, and, depending on the type of crane, a boom hoist command.

Further, the controller 3 includes a resonance frequency computing unit 4 that computes the resonance frequency of the rope 21, which suspends the load 22, based on the detection result by the rope length detecting unit, and includes maximum value limiting units 5*a*, 5*b* that use the signal concerning the turn and the boom hoist inputted from the transportation command inputting and transmitting unit, and that limit the transportation command for the load 22 inputted from the transportation command inputting and transmitting unit. The controller further includes filter units 6*a*, 6*b* and hence computes drive conditions for the crane so as to suppress the sway of the load 22 generated at the moment when the load 22 is transported to the desired position based on the computation results of the resonance frequency computing unit 4 and the maximum value limiting units 5*a*, 5*b*.

Further, the controller 3 includes output transmitting means for outputting the crane drive conditions to both the turning motor and the boom-hoisting motor.

Next, the operation of the controller used for the feedforward control used in this invention is described in detail.

The operator inputs a transportation command for a load 22 into the controller 3 via the operation box 38 and the receiver 39, which operation box acts as a transportation command inputting and transmitting unit for inputting and outputting a transportation command for the load 22. In the controller, the maximum value among at least one of a transportation speed, a transportation acceleration, and a transportation jerk in the transportation command is limited by the maximum value limiting units 5*a*, 5*b* based on the signal inputted from the transportation command inputting and transmitting unit. Further, in the controller the resonance frequency of the rope is computed by the resonance frequency computing unit 4 based on the detection result by the rope length detection unit.

In the controller, the filter units 6*a*, 6*b* further compute signals to suppress the sway of the load remaining at a moment when it is transported to a desired position, by using the computation results from the maximum value limiting units 5*a*, 5*b* and the resonance frequency computing unit 4.

In this invention the signal that suppresses the sway of the load is a feedforward-processed signal generated by passing a signal for transportation conditions through the filter units 6*a*, 6*b*, which remove the resonance frequency that is computed from just the signal of the rope length input.

Moreover, the filter units 6*a*, 6*b* here consist by combining a low-pass filter, a high-pass filter, a band-pass filter, a notch filter, and so on, so that they are appropriate for the crane. No signal transformation is made that uses a mechanical model for a crane.

Therefore, the sway can surely and easily be controlled even if the input signal is simple and rough.

Further, the control units 35, 36, 37 comprise an output transmitting unit for outputting a crane drive condition to each of the motors 32, 33, and 34.

When the influence of the turbulence for the subjects to be controlled is unclear, in addition to the feedforward control a feedback control may be added.

Figure 6:
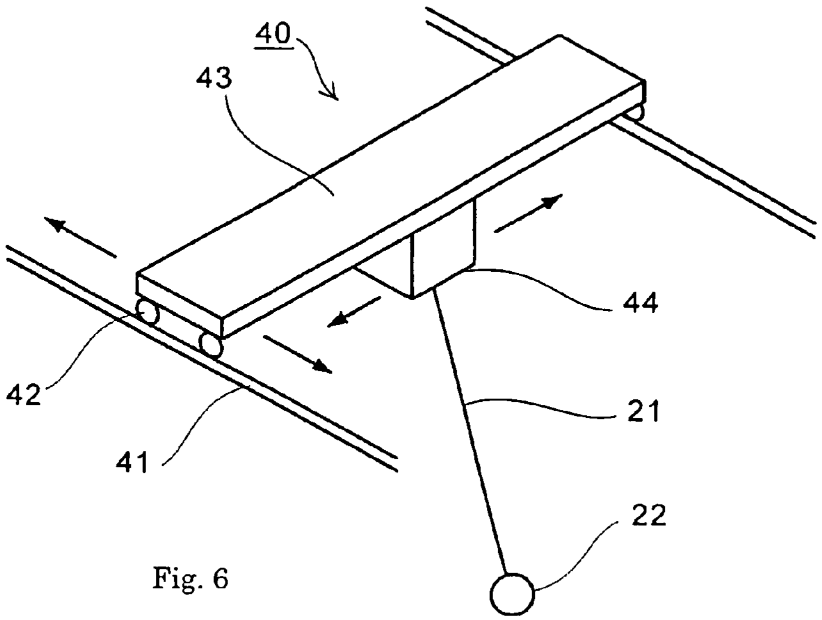
FIG. 6 is a schematic perspective view of another crane (an overhead traveling crane) to execute this invention.

Though the foregoing description is made for a crane with a boom and for the control of the sway of a load carried by that crane, such a control can be similarly applied to an overhead traveling crane as shown in FIG. 6.

An embodiment of an overhead traveling crane 40 as shown in FIG. 6 runs through wheels 42 on a pair of spaced-apart rails 41 disposed near a ceiling. The crane 40 has a girder 43 secured to the wheels 42 for running along the rails (as shown by arrows); a trolley 44 attached to the bottom of the girder 43 for running across the girder, i.e., in the directions shown by another pair of arrows; and a rope 21 suspended from the trolley 44 so as to be rolled up and down to suspend a load 22. As is well known, the girder runs by means of a running motor (not shown) attached to it, and the trolley 44 runs transversely by means of a trolley motor (not shown) attached to it. The rope 21 is rolled up and down by a rolling-up motor (not shown) attached to the trolley.

These motors (not shown) and their control units (not shown, but corresponding to the control units 35, 36, 37 shown in FIG. 1) compose the crane drive unit 9 shown in FIG. 2. Further, it is clear that the control discussed above can be applied to the overhead traveling crane 40 when the boom-turn command and the boom-hoist command in FIG. 5 are replaced with a girder run command and a girder traverse command for the overhead traveling crane 40 shown in FIG. 6.

Though the overhead traveling crane of FIG. 6 has a transverse trolley, this trolley may be eliminated. In that case, the rolling-up motor for rolling up the rope is installed on the girder.

Moreover, the overhead traveling crane need not have a trolley or a rolling-up motor, but instead may have a rope that has a constant length. In this case, the signal concerning the rope length is constant.

Though the embodiments of this invention are explained above by showing in the drawings the rope being rolled up and down, they are just examples of the present invention, and the invention is not limited to them. It would be clear to one skilled in the art that modifications and changes can be made to those embodiments without departing from the spirit of the invention. It is intended that the invention include the modifications and changes, and that the scope of the invention be defined by the claims.

The invention claimed is:

1. A method for controlling a crane drive unit so as to suppress sway of a load suspended by a rope of a crane, which sway occurs when the load has been transported from a first position to a second position, the control being made by operating a controller having a filter unit using a feedforward control program, comprising:

removing a component near a resonance frequency by the filter unit from a transportation command for the load, in which command a maximum value among at least one of transportation speed, transportation acceleration, and transportation jerk is limited, under the resonance frequency sequentially computed from a rope length that is a distance from the center of rotation of the sway of the rope to the center of gravity of the load and under parameters that relate to a control unit of the crane drive unit and that are previously computed so as not to exceed a performance of the crane drive unit;

wherein based on expression (1) or (2), the component near the resonance frequency is removed by using parameters $a_i$ (f) and $b_j$ (f), which are determined by a simulation under a constraint condition that maximum speeds in the transportation command do not exceed a limitation of a maximum value of the crane drive unit $$y(t) = b_0(f)x(t) + b_1(f)x(t-1) + b_2(f)x(t-2) + \dots - a_1(f)y(t-1) - a_2(f)y(t-2) - \dots \quad \text{Expression (1)}$$

-continued $$y(t)=\sum_{j=0}^{m} b_j(f)x(t-j)-\sum_{i=1}^{n} a_i(f)y(t-i)$$

where $a_i$ (f) and $b_j$ (f) are parameters mediated by the resonance frequency f sequentially computed for the varying length of the rope, and $$F(S)=\frac{Y(S)}{X(S)}=\frac{b_0(f)S^0+b_1(f)S^1+b_2(f)S^2+\ldots}{a_0(f)S^0+a_1(f)S^1+a_2(f)S^2+\ldots}=\frac{\sum_{j=0}^{m} b_j(f)S^j}{\sum_{i=0}^{n} a_i(f)S^i} \quad \text{Expression (2)}$$

where expression (1) is obtained by carrying out a Z-transformation to the transfer function of the filter shown in expression (2), and S is a Laplacian operator, and inputting the transportation command from which the component near the resonance frequency is removed into the crane drive unit, thereby controlling the crane drive unit so that the load does not greatly sway when the load is transported from the first position to the second position.

2. A system for controlling a crane drive unit so as to suppress sway of a load suspended by a rope of a crane, which sway occurs when the load has been transported from a first position to a second position, the control being made by operating a controller having a filter unit using a feedforward control program, comprising:

a rope length detection unit for detecting a rope length that is a distance from the center of rotation of the sway of the rope to the center of gravity of the load;

a resonance frequency computing unit for computing a resonance frequency of the rope having said rope length;

a transportation command transmitting unit for transmitting a transportation command for the load given by a transportation command applicator;

a parameter computing unit for previously computing parameters for a control unit of the crane drive unit so that the parameters do not exceed a performance of the crane drive unit;

a parameter storing unit for receiving and storing the parameters from the parameter computing unit;

a maximum value limiting unit for limiting a maximum value among at least one of a transportation speed, transportation acceleration, and transportation jerk in the transportation command for the load from the transportation command transmitting unit under the parameters from the parameter storing unit; and a filter unit for receiving the resonance frequency from the resonance frequency computing unit, the filter unit removing a component near the resonance frequency from the transportation command in which the maximum value is limited by the maximum value limiting unit, under the parameters from the parameter storing unit, the filter unit inputting in the crane drive unit the transportation command from which the component near the resonance frequency is removed, wherein based on expression (1) or (2), the component near the resonance frequency is removed by using parameters $a_i$ (f) and $b_j$ (f), which are determined by a simulation under a constraint condition that maximum speeds in the transportation command do not exceed a maximum speed of the crane drive unit, $$y(t)=b_0(f)x(t)+b_1(f)x(t-1)+b_2(f)x(t-2)+\ldots-a_1(f)y(t-1)-a_2(f)y(t-2)-\ldots \quad \text{Expression (1)}$$

$$y(t)=\sum_{j=0}^{m} b_j(f)x(t-j)-\sum_{i=1}^{n} a_i(f)y(t-i)$$

where $a_i$ (f) and $b_j$ (f) are parameters mediated by the resonance frequency f sequentially computed for the varying length of the rope, and $$F(S)=\frac{Y(S)}{X(S)}=\frac{b_0(f)S^0+b_1(f)S^1+b_2(f)S^2+\ldots}{a_0(f)S^0+a_1(f)S^1+a_2(f)S^2+\ldots}=\frac{\sum_{j=0}^{m} b_j(f)S^j}{\sum_{i=0}^{n} a_i(f)S^i} \quad \text{Expression (2)}$$

where expression (1) is obtained by carrying out a Z-transformation to the transfer function of the filter shown in expression (2), and S is a Laplacian operator.

3. A non-transitory computer-readable medium in which a feedforward control program is stored, the feedforward control program controlling a crane drive unit by a controller having a filter unit so as to suppress sway of a load suspended by a rope of a crane, which sway occurs when the load has been transported from a first position to a second position, the feedforward control program being programmed to cause the filter unit of the controller to remove a component near a resonance frequency from a transportation command for the load, in which command a maximum value among at least one of transportation speed, transportation acceleration, and transportation jerk is limited, under the resonance frequency sequentially computed from a rope length that is a distance from the center of rotation of the sway of the rope to the center of gravity of the load and under parameters for a control unit of the crane drive unit, which parameters are previously computed so as not to exceed a performance of the crane drive unit, the feedforward control program also causing the filter unit to input the transportation command from which the component near the resonance frequency is removed in the crane drive unit, wherein based on expression (1) or (2), the component near the resonance frequency is removed by using parameters $a_i$ (f) and $b_j$ (f), which are determined by a simulation under a constraint condition that maximum speeds in the transportation command do not exceed a limitation of a maximum value of the crane drive unit, $$y(t)=b_0(f)x(t)+b_1(f)x(t-1)+b_2(f)x(t-2)+\ldots-a_1(f)y(t-1)-a_2(f)y(t-2)-\ldots \quad \text{Expression (1)}$$

$$y(t)=\sum_{j=0}^{m} b_j(f)x(t-j)-\sum_{i=1}^{n} a_i(f)y(t-i)$$

where $a_i$ (f) and $b_j$ (f) are parameters mediated by the resonance frequency f sequentially computed for the varying length of the rope, and $$F(S) = \frac{Y(S)}{X(S)} = \frac{b_0(f)S^0 + b_1(f)S^1 + b_2(f)S^2 + \dots}{a_0(f)S^0 + a_1(f)S^1 + a_2(f)S^2 + \dots} = \frac{\sum_{j=0}^{m} b_j(f)S^j}{\sum_{i=0}^{n} a_i(f)S^i} \quad \text{Expression (2)}$$

where expression (1) is obtained by carrying out a Z-transformation to the transfer function of the filter shown in expression (2), and S is a Laplacian operator.

* * * * *

UNITED STATES PATENT AND TRADEMARK OFFICE

CERTIFICATE OF CORRECTION

PATENT NO. : 8,005,598 B2
APPLICATION NO. : 10/567165
DATED : August 23, 2011
INVENTOR(S) : Kazuhiko Terashima et al.

It is certified that error appears in the above-identified patent and that said Letters Patent is hereby corrected as shown below:

On Title page, Item (73), line 1, “Aichin-Ken (JP),” should read -- Aichi-Ken (JP), --;

Claim 1, column 10, line 61, after “unit”, insert -- , --.

Signed and Sealed this
First Day of January, 2013

David J. Kappos
*Director of the United States Patent and Trademark Office*